(12) United States Patent
Hatch et al.

(10) Patent No.: US 8,973,016 B1
(45) Date of Patent: Mar. 3, 2015

(54) PROCESSING AN INPUT EVENT WITHIN AN APPLICATION

(71) Applicant: Google Inc., Mountain View, CA (US)

(72) Inventors: Simon Hatch, San Francisco, CA (US); Eric Scott Penner, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/229,576

(22) Filed: Mar. 28, 2014

(51) Int. Cl.
G06F 13/00 (2006.01)
G06F 9/54 (2006.01)

(52) U.S. Cl.
CPC .................................... G06F 9/542 (2013.01)
USPC .......................................................... 719/318

(58) Field of Classification Search
CPC ........................................................ G06F 9/542
USPC .......................................................... 719/318
See application file for complete search history.

(56) References Cited

U.S. PATENT DOCUMENTS

| 8,436,806 | B2* | 5/2013 | Almalki et al. | 345/104 |
| 8,589,950 | B2* | 11/2013 | Treat et al. | 719/318 |
| 2005/0132376 | A1* | 6/2005 | Rodgers et al. | 718/100 |
| 2014/0089944 | A1* | 3/2014 | Treat et al. | 719/318 |

* cited by examiner

Primary Examiner — Andy Ho
(74) Attorney, Agent, or Firm — McDermott Will & Emery LLP

(57) ABSTRACT

Processing an input event within an application includes detecting an input event within an application executing on a first thread, the input event being associated with an event handler. A separate execution corresponding to a current state of the application is performed on a second thread based on the event handler associated with the input event. Within the separate execution, a determination is made whether the event handler modifies at least one of a document associated with the application or a default behavior of the application. In a case where the event handler does not modify at least one of the document or the behavior, the subject technology refrains from invoking the event handler on the first thread.

20 Claims, 5 Drawing Sheets

PROCESSING AN INPUT EVENT WITHIN AN APPLICATION

BACKGROUND

The present disclosure generally relates to applications, and in particular, to processing an input event within an application (e.g., a web application).

Touch sensitive devices are particularly sensitive to input latency since the user is physically touching the display and can easily see discrepancies between their real movement and the movement on screen. Reducing latency during touch actions can result in an improvement in user experience.

SUMMARY

The disclosed subject matter relates to a system for processing an input event within an application. The system comprises one or more processors, and a machine-readable medium comprising instructions stored therein, which when executed by the processors, cause the processors to perform operations comprising detecting an input event within an application executing on a first thread, the input event being associated with an event handler. The operations further comprise performing a separate execution corresponding to a current state of the application on a second thread based on the event handler associated with the input event, and determining, within the separate execution, whether the event handler modifies at least one of a document associated with the application or a default behavior of the application. In addition, the operations comprise refraining, in a case where the event handler does not modify at least one of the document or the default behavior, from invoking the event handler on the first thread.

The disclosed subject matter further relates to a machine-readable medium comprising instructions stored therein, which when executed by a system, cause the system to perform operations comprising detecting an input event within an application executing on a first thread, the input event being associated with an event handler. The operations further comprise performing a separate execution corresponding to a current state of the application on a second thread based on the event handler associated with the input event, and determining whether the separate execution is limited to read-only access for the application. In addition, the operations comprise refraining, in a case where the separate execution is limited to read-only access, from invoking the event handler on the first thread.

The disclosed subject matter also relates to a method for processing an input event within an application. The method comprises detecting an input event within an application executing on a first thread, the input event being associated with an event handler, and performing a separate execution corresponding to a current state of the application on a second thread based on the event handler associated with the input event. The method further comprises determining whether the separate execution is limited to read-only access for the application, and refraining, in a case where the separate execution is limited to read-only access, from invoking the event handler on the first thread. In addition, the method comprises invoking, in a case where the separate execution is not limited to read-only access, the event handler on the first thread.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
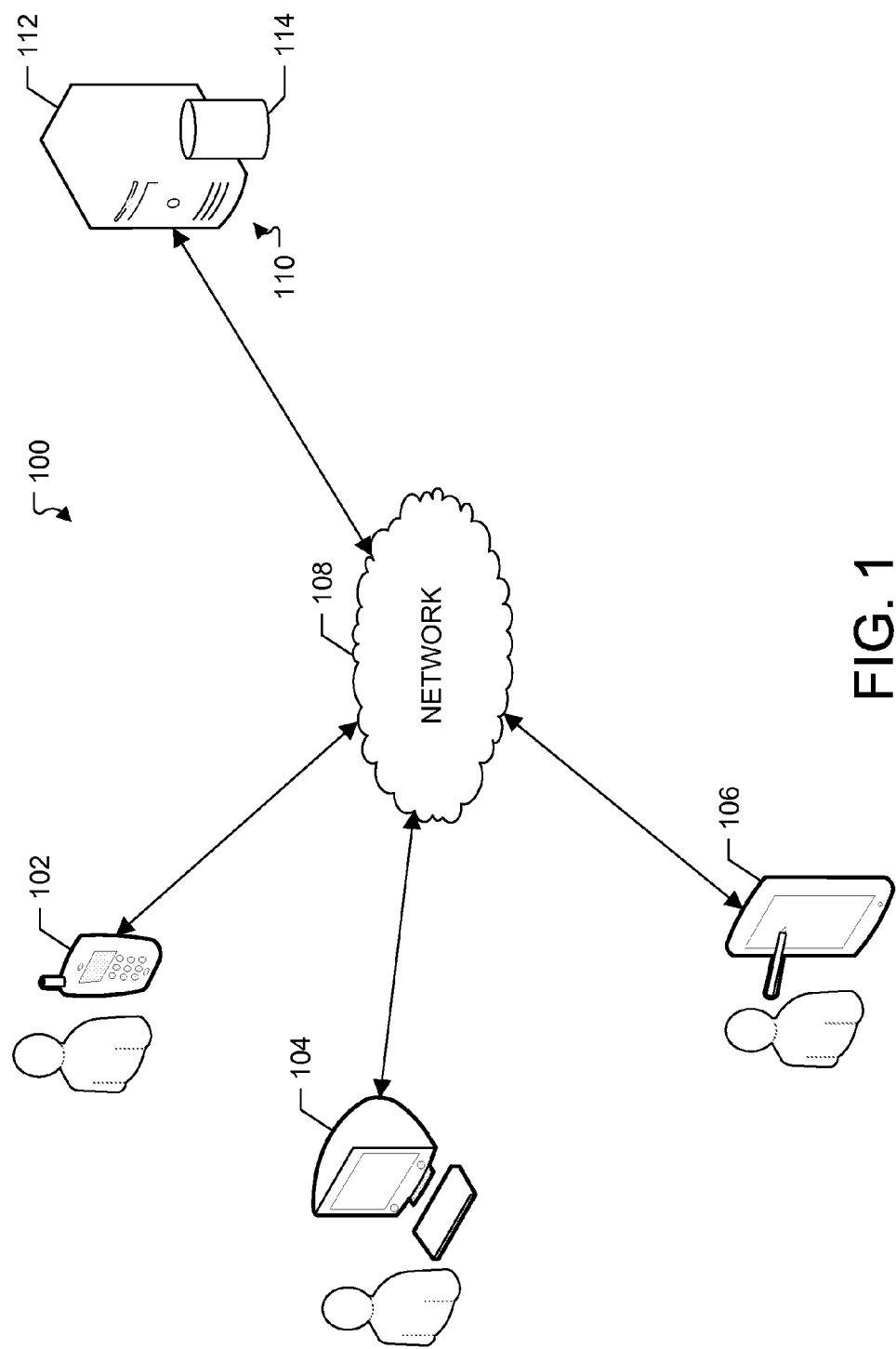
FIG. 1 illustrates an example network environment in which an input event is processed within an application.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, touch sensitive devices are particularly sensitive to input latency since the user is physically touching the display and can easily see discrepancies between their real movement and the movement on screen. Reducing latency during touch actions can result in an improvement in user experience.

In web browsers (or other native applications for accessing web content), applications (e.g., web applications written in Javascript or another language) have the ability to intercept input events and override the browser's default behavior. If an input handler is installed, input events must be queued up to be processed in sequence with other web-application callbacks.

This happens with no parallelization because typical applications are inherently single threaded (e.g., running on a single thread at the operating system level), and conventional systems do not detect if a piece of code has any side effects which would make the calls dependent on each other or on some shared state.

Specifically, if the user is dragging their finger on the screen to scroll but the application (e.g., web application) thread is tied up with a particularly expensive callback, the input events are not processed until later, resulting in input latency. This is true even if the browser's default input event behavior is not modified by the registered input handler. If the host environment (e.g., the browser or other native application) could determine that the touch handler did not override the default behavior when called with a particular input event, the input could be handled on a different and more responsive thread (e.g., at the operating system level).

The subject disclosure provides for processing an input event within an application (e.g., web application), to reduce latency therein. An input event is detected within an application executing on a first thread, the input event being associated with an event handler. A separate execution corresponding to a current state of the application is performed on a second thread based on the event handler associated with the input event. Within the separate execution, a determination is made whether the event handler modifies at least one of a document associated with the application or a default behavior of the application. In a case where the event handler does not modify at least one of the document or the behavior, the subject technology refrains from invoking the event handler on the first thread.

FIG. 1 illustrates an example network environment in which an input event is processed within an application. A network environment 100 includes computing devices 102, 104 and 106 (hereinafter "102-106") and computing system 110. Computing devices 102-106 and computing system 110 can communicate with each other through a network 108. Computing system 110 can include one or more computing devices 112 (e.g., one or more servers), and one or more computer-readable storage devices 114 (e.g., one or more databases).

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to the electronic devices. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection.

In example aspects, a computing device (e.g., any of computing devices 102-106) detects an input event within an application (e.g., a web application such as a webpage displayed on the computing device and hosted by server 110) executing on a first thread, the input event being associated with an event handler. The computing device performs a separate execution corresponding to a current state of the application on a second thread based on the event handler associated with the input event. The computing device determines, within the separate execution, whether the event handler modifies at least one of a document associated with the application or a default behavior of the application. In a case where the event handler does not modify at least one of the document or the default behavior, the computing device refrains from invoking the event handler on the first thread. In a case where the event handler modifies at least one of the document or the default behavior, the computing device invokes the event handler on the first thread.

Figure 2:
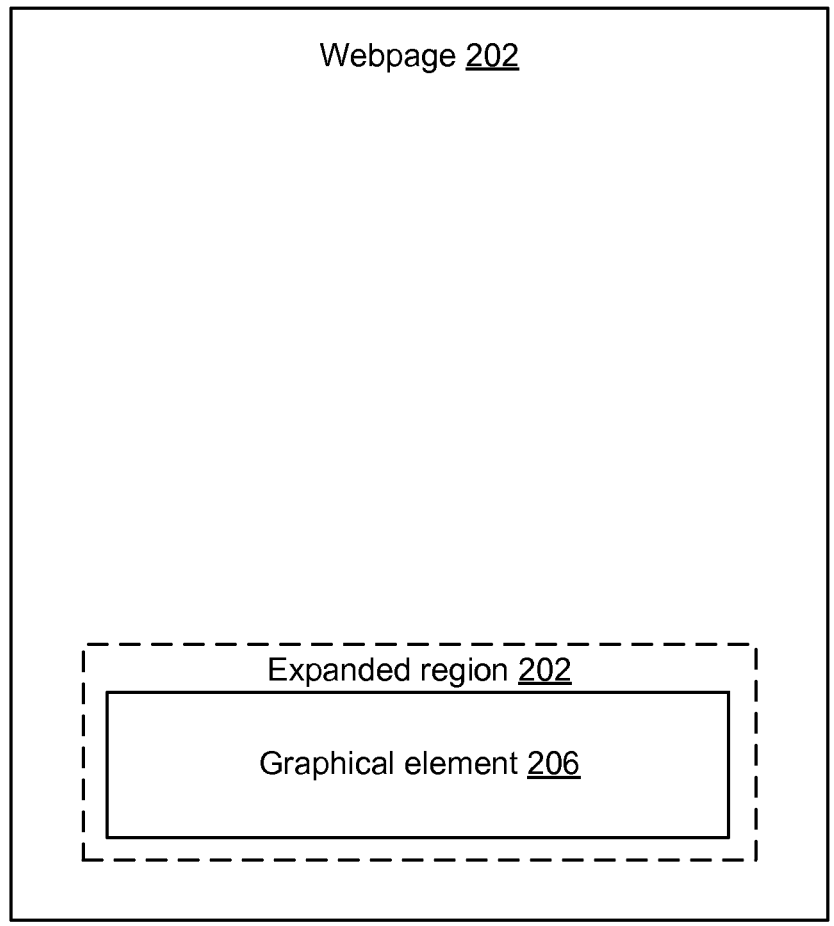
FIG. 2 illustrates an example of a webpage in which an event handler is implemented to process input associated with a graphical element.

FIG. 2 illustrates an example of a webpage in which an event handler is implemented to process input associated with a graphical element. FIG. 2 illustrates a webpage 202 which includes a graphical element 206 and an expanded region 204 associated with graphical element 206. Webpage 202 can be presented within the host environment (e.g., a web browser or other native application) running on any of client devices 102-106, for accessing web content (e.g., from server 106). The application may run on a first thread of execution (e.g., at the operating system level).

As noted above, applications such as webpages (e.g., written in Javascript or another language) have the ability to intercept input events and override the default behavior of the host environment (e.g., browser or other native application). If an input handler is installed for a webpage (e.g., webpage 202), input events are queued up to be processed in sequence with other web-application callbacks. For example, the additional callbacks may correspond to garbage collection operations, layout operations, or other operations associated with webpage 202.

In conventional systems, the input handling occurs with no parallelization because typical web applications are inherently single threaded. Conventional systems do not detect if a piece of code has any side effects that would make the calls dependent on each other or on some shared state.

For example, if the user is dragging their finger on the screen (e.g., the display of web page 202) to scroll but the application thread is tied up with a particularly expensive callback (e.g., a layout operation, garbage collection), the input events are not processed until later, resulting in input latency. This latency can occur even if the web application's default input event behavior is not modified by the registered input handler. If the host environment (e.g., browser or native application) could determine that the touch handler does not override the default behavior when called with a particular input event, the input could be handled on a different and more responsive thread (e.g., a second thread of execution, at the operating system level).

The subject disclosure provides for performing a separate execution of webpage 202 within a different thread (e.g., a second thread), in response to detected touch input. The separate execution can be based on a 'snapshot' of the state of the application at the time the input event is detected. Within the separate execution, the computing device (e.g., any of devices 102-106) can execute the input event in a read-only context, in which a document or default behavior of the webpage is not permitted to be modified. This separate execution can be performed in parallel with the main execution.

In example aspects, the different thread (e.g., second thread) corresponds to a second execution context, such as a forked process. In this regard, a "fork" can be an operation in which a process creates a copy of itself.

In example aspects, the snapshot of the state of the application can be an identical, or substantially identical, copy of the webpage (e.g., webpage 202) at the time of detecting the input event. For example, the snapshot can correspond to a separate execution of webpage 202 (e.g., of the Javascript of the webpage), such that there are two programs with the same, or substantially the same, state.

In this regard, the second thread can speculatively execute the input handler, and wait until the speculative execution ends, a timeout occurs, or a write access is attempted. If a write access is attempted or execution takes too long, the application can simply abort the execution and fall back to rescheduling the input events after the first thread's current block of execution has finished.

However, if no write access is detected and the touch handler does not override the default behavior for the event in question, the second thread may no longer need to wait for the first thread, and the input event may no longer need to be executed on the first thread (e.g., the input event is known to have no noticeable side effects). In example aspects, the rate at which state snapshots are taken is the same rate at which the web-application presents new state to the user, thus the time shifting of the input event to a prior snapshot is also not noticeable to the user, nor to the web-application itself.

In the example of FIG. 2, a touch handler for webpage 202 may need to modify the application's default behavior (e.g., of scrolling), but only when the touch is within a preset distance of a graphical element 206. The preset distance is depicted as expanded region 204 in FIG. 2. In one approach, the touch handler can be installed only on graphical element 206 itself. However, this approach may not capture all the touch events required (e.g., input within expanded region 204).

In a different approach, according to example aspects, a touch handler is installed for the entire document (e.g., all of webpage 202). A distance comparison performed in the touch handler, where the default behavior is modified only if the distance condition is satisfied (e.g., if the touch event is within expanded region 204).

Thus, the subject technology is seen to improve latency by invoking the touch handler on a more responsive thread (e.g., second thread) and performing the default action immediately in the most common case (e.g., where default behavior is not modified, since the distance condition is not satisfied). Furthermore, in the few cases where the distance condition is satisfied, the event can be invoked on the less responsive web-application thread (e.g., the first thread).

Figure 3:
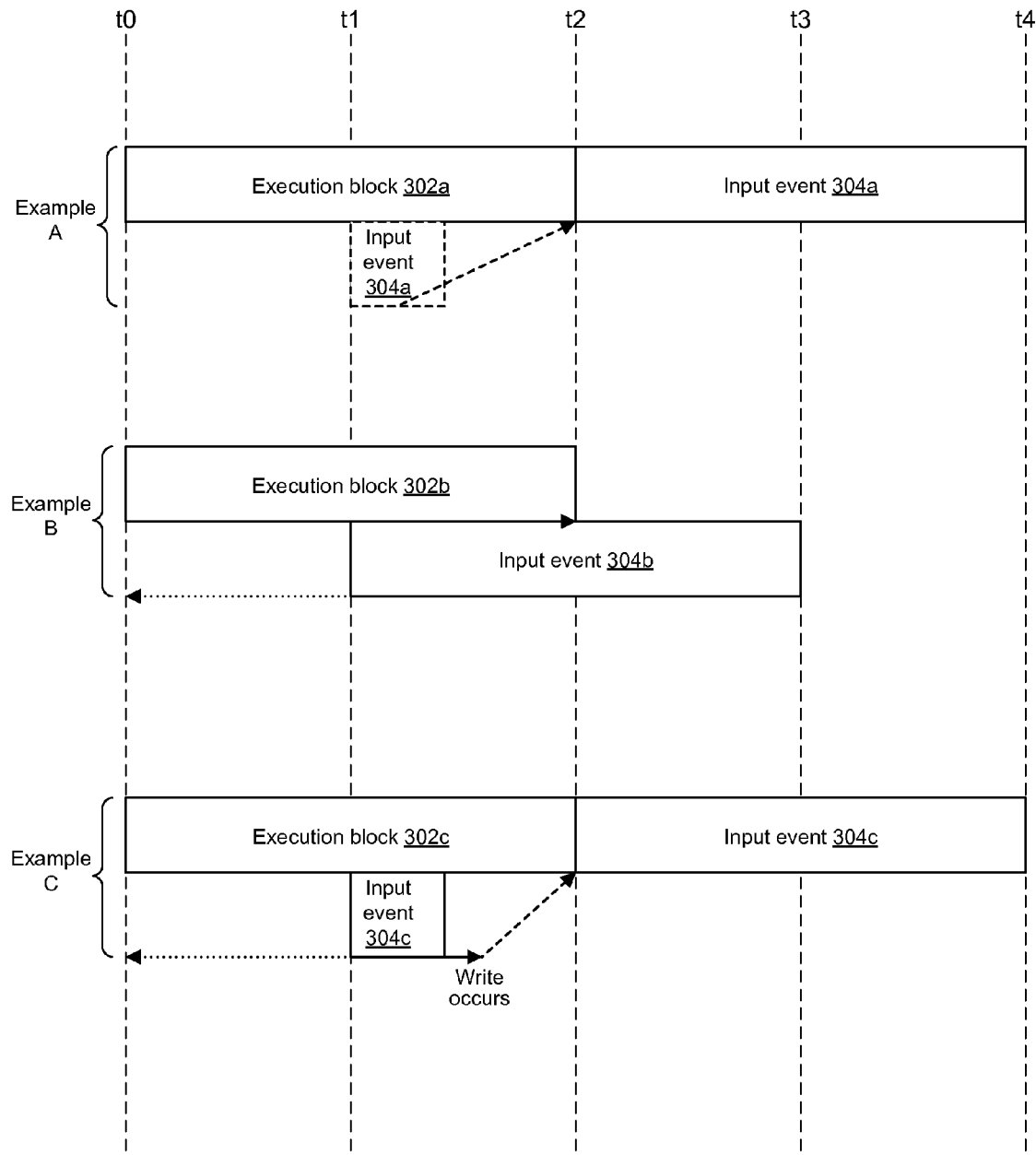
FIG. 3 is a block diagram illustrating an example of adjusting a timestamp of an input event associated with an application.

FIG. 3 is a block diagram illustrating an example of adjusting a timestamp of an input event associated with an application. FIG. 3 includes three examples (e.g., Examples A, B and C), which correspond to different scenarios for handling an input event.

Example A corresponds to input event handling in which a speculative execution is not performed in association with the input event handler (e.g., in a conventional system). In Example A, a main thread (e.g., a first thread at the operating system level) is executing a block 302a of code (e.g., Javascript) at time t0. An input event 304a is detected at time t1, and queued to be processed. Input event 304a is not handled until time t2, corresponding to the end of execution of block 302a. The handler for input event 304a can be executed at time t2, for finishing at time t4.

Example B corresponds to input event handling in which a speculative execution is performed, and the event handler does not modify the document associated the application (e.g., webpage 202) or does not modify default behavior of the application. In Example B, the first thread is executing a block 302b of code (e.g., Javascript) at time t0. An input event 304b is detected at time t1, and the timestamp of input event 304b is backdated to time t0. The input event handler is then speculatively executed (e.g., on a second thread at the operating system level) in parallel to the main execution (e.g., of block 302b on the first thread), but in a read-only context, allowing the input handler to finish by time t3. As noted above, the second thread can correspond to a second execution context, such as a forked process. In Example B, the speculative execution is limited to read-only access (e.g., no modification to the behavior or document). By virtue of the speculative execution, processing of the input handler is faster than that in Example A.

Example C corresponds to input event handling in which a speculative execution is performed, and the event handler modifies a document associated with the application (e.g., a web application such as webpage 202) and/or modifies the default behavior of the application. In Example C, the first thread is executing a block 302c of code (e.g., Javascript) at time t0. An input event 304c is detected at time t1, and the timestamp is backdated to time t0. The input event handler is then speculatively executed (e.g., on a second thread at the operating system level) in parallel to the main execution (e.g., of block 302c on the first thread) in a read-only context. A write is detected (e.g., for a document, or a modification of a default behavior is detected) and the execution is aborted, and the input event is queued as normal to be executed at t2. The input event can be queued as normal by scheduling the input event to be handled on the main thread (e.g., the first thread), for processing in sequence with other web-application callbacks on the main thread (e.g., at the operating system level).

As noted above, the speculative execution is performed in a read-only context, such that access which does not correspond to read-only access causes the speculative execution to fail. In example aspects, the speculative execution can be seen as a pass/fail test of whether the execution is read-only. Examples of operations that can cause the speculative execution to fail include, but are not limited to, modifying a document or modifying a default behavior of the application. In another example, speculative execution can fail in a case where a timeout occurs (e.g., where the duration of time for running the speculative execution exceeds a preset time value).

In another example, the speculative execution may be handled in conjunction with a availability status of the main thread (e.g., first thread). A determination can be made that the main thread is clear, or substantially clear, such that other web-application callbacks on the main thread are below a minimum threshold. In response to this determination, the speculative execution may be skipped (or aborted, if already invoked), and the input event can be queued as normal on the main thread.

Figure 4:
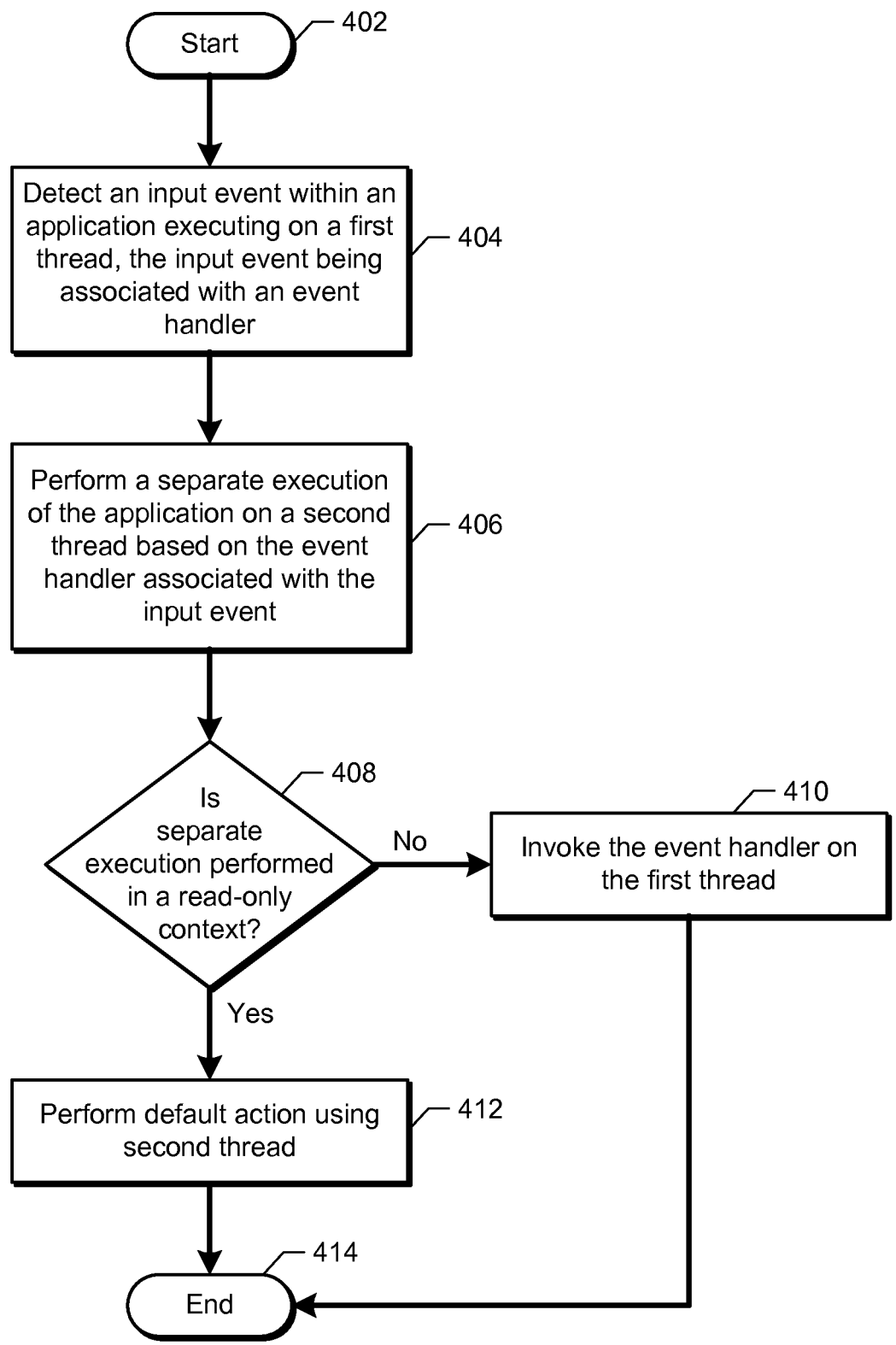
FIG. 4 illustrates an example process by which an input event is processed within an application.

FIG. 4 illustrates an example process by which an input event is processed within an application. Following start block 402, an input event is detected within an application (e.g., web application) executing on a first thread at block 404. The input event is associated with an event handler.

At block 406, a separate execution corresponding to a current state of the application is performed on a second thread based on the event handler associated with the input event. In example aspects, the second thread corresponds to a second execution context (e.g., a forked process). The separate execution can run in parallel with execution of the application. Execution of the application and the separate execution can be performed using a language such as Javascript.

Performing the separate execution corresponding to the current state of the application can include backdating a timestamp of the input event to correspond with a timestamp of the first thread. Alternatively, or in addition, performing the separate execution can include obtaining a snapshot of the application, the snapshot corresponding to the current state of the application at a time of detecting the input event, and performing the separate execution based on the obtained snapshot.

At decision block 408, an inquiry is made whether the event handler is limited to read-only access (e.g., does not modify a document associated with the application or a default behavior of the application).

If the answer to the inquiry at decision block 408 is no, the event handler is invoked on the first thread at block 410. Invoking the event handler on the first thread can include queuing the input event for execution on the first thread. If the answer to the inquiry at decision block 408 is yes, a default action is performed using the second thread at block 412, and the event handler is not invoked (e.g., the process refrains from invoking the event handler).

In example aspects, a determination can be made that a threshold time period has passed in association with the separate execution, and in response to determining that the threshold time period has passed, the process can refrain from invoking the event handler on the first thread. Alternatively, or in addition, a determination can be made that an availability of the first thread meets a predetermined threshold of availability, and in response to determining that the availability meets the predetermined threshold of availability, the event handler can be invoked on the first thread. The process then ends at end block 414.

Figure 5:
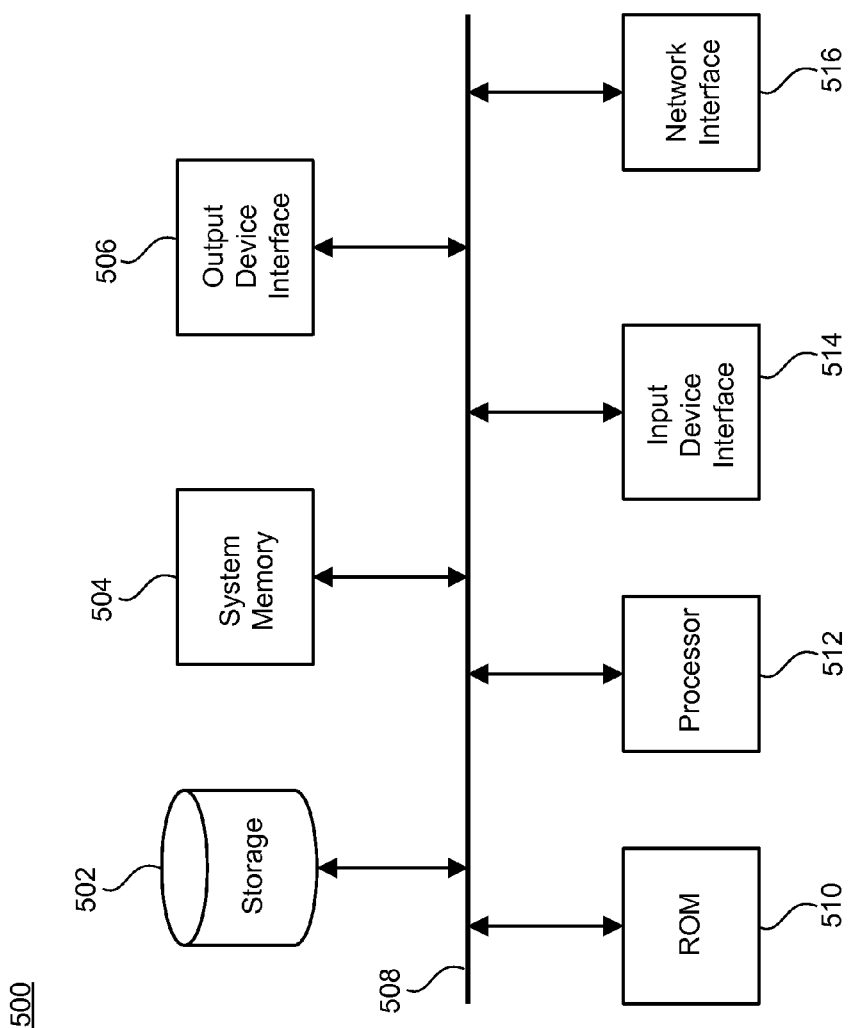
FIG. 5 conceptually illustrates an example electronic system with which some implementations of the subject technology can be implemented.

FIG. 5 conceptually illustrates an example electronic system with which some implementations of the subject technology can be implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as permanent storage device 502.

Other implementations use a removable storage device (for example, a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units include instructions for processing an input event in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, for example, cathode ray tubes (CRT) or liquid crystal displays (LCD). Some implementations include devices, for example, a touchscreen that functions as both input and output devices.

Finally, as shown in FIG. 5, bus 508 also couples electronic system 500 to a network (not shown) through a network interface 516. In this manner, the computer can be a part of a network of computers (for example, a local area network ("LAN"), a wide area network ("WAN"), or an Intranet, or a network of networks, for example, the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A system for processing an input event within an application, the system comprising:
   one or more processors; and
   a machine-readable medium comprising instructions stored therein, which when executed by the processors, cause the processors to perform operations comprising:
   detecting an input event within an application executing on a first thread, the input event being associated with an event handler;
   performing a separate execution corresponding to a current state of the application on a second thread based on the event handler associated with the input event;
   determining, within the separate execution, whether the event handler modifies at least one of a document associated with the application or a default behavior of the application; and
   refraining, in a case where the event handler does not modify at least one of the document or the default behavior, from invoking the event handler on the first thread.

2. The system of claim 1, the operations further comprising:
   invoking, in a case where the event handler modifies at least one of the document or the default behavior, the event handler on the first thread.

3. The system of claim 2, wherein invoking the event handler on the first thread comprises queuing the input event for execution on the first thread.

4. The system of claim 1, the operations further comprising:
   determining that a threshold time period has passed in association with the separate execution; and
   refraining, in response to determining that the threshold time period has passed, from invoking the event handler on the first thread.

5. The system of claim 1, the operations further comprising:
   determining that an availability of the first thread meets a predetermined threshold of availability;
   invoking, in response to determining that the availability meets the predetermined threshold of availability, the event handler on the first thread.

6. The system of claim 1, wherein performing the separate execution corresponding to the current state of the application comprises backdating a timestamp of the input event to correspond with a timestamp of the first thread.

7. The system of claim 1, wherein performing the separate execution comprises:
   obtaining a snapshot of the application, the snapshot corresponding to the current state of the application at a time of detecting the input event;
   performing the separate execution based on the obtained snapshot.

8. The system of claim 1, wherein the separate execution runs in parallel with execution of the application.

9. The system of claim 1, wherein execution of the application and the separate execution are performed using Javascript.

10. A machine-readable medium comprising instructions stored therein, which when executed by a system, cause the system to perform operations comprising:
    detecting an input event within an application executing on a first thread, the input event being associated with an event handler;
    performing a separate execution corresponding to a current state of the application on a second thread based on the event handler associated with the input event;
    determining whether the separate execution is limited to read-only access for the application; and
    refraining, in a case where the separate execution is limited to read-only access, from invoking the event handler on the first thread.

11. The machine-readable medium of claim 10, wherein determining whether the separate execution is limited to read-only access comprises:
    determining, within the separate execution, whether the event handler modifies a document associated with the application;
    determining, within the separate execution, whether the event handler modifies a default behavior of the application.

12. The machine-readable medium of claim 10, the operations further comprising:
    invoking, in a case where the separate execution is not limited to read-only access, the event handler on the first thread.

13. The machine-readable medium of claim 12, wherein invoking the event handler on the first thread comprises queuing the input event for execution on the first thread.

14. The machine-readable medium of claim 10, the operations further comprising:
    determining that a threshold time period has passed in association with the separate execution; and refraining, in response to determining that the threshold time period has passed, from invoking the event handler on the first thread.

15. The machine-readable medium of claim 10, the operations further comprising:
  determining that an availability of the first thread meets a predetermined threshold of availability;
  invoking, in response to determining that the availability meets the predetermined threshold of availability, the event handler on the first thread.

16. The machine-readable medium of claim 10, wherein performing the separate execution corresponding to the current state of the application comprises backdating a timestamp of the input event to correspond with a timestamp of the first thread.

17. The machine-readable medium of claim 10, wherein performing the separate execution comprises:
  obtaining a snapshot of the application, the snapshot corresponding to the current state of the application at a time of detecting the input event;
  performing the separate execution based on the obtained snapshot.

18. The machine-readable medium of claim 10, wherein the separate execution runs in parallel with execution of the application.

19. The machine-readable medium of claim 10, wherein execution of the application and the separate execution are performed using Javascript.

20. A method for processing an input event within an application, the method comprising:
  detecting an input event within an application executing on a first thread, the input event being associated with an event handler;
  performing a separate execution corresponding to a current state of the application on a second thread based on the event handler associated with the input event;
  determining whether the separate execution is limited to read-only access for the application;
  refraining, in a case where the separate execution is limited to read-only access, from invoking the event handler on the first thread; and
  invoking, in a case where the separate execution is not limited to read-only access, the event handler on the first thread.

* * * * *